Patented July 3, 1934

1,965,299

UNITED STATES PATENT OFFICE 1,965,299

ABRADING AND POLISHING COMPOSITION

Philip Alfred Patterson, Detroit, Mich., assignor to McAleer Manufacturing Company, Detroit, Mich.

No Drawing. Application February 27, 1934,
Serial No. 713,236

6 Claims. (Cl. 51—280)

This invention relates to polishing and polishing compositions suitable for polishing lacquers, enamels, etc. and more particularly to polishing compositions capable of being handled by mechanical polishing machines.

The application of lacquers, enamels, etc. to metal or wood, in order to enhance its beauty or to protect the said metal or wood from the destructive action of light and the elements, results in a finish that is marred by defects such as pits, orange peel, brush marks, sand-paper scratches etc. Such a finish necessitates polishing to acquire a high lustre, the polish removing the above defects and the finished lacquer, enamel etc. approaching a truly flat surface capable of reflecting light.

Various polishing compositions and methods have heretofore been proposed for the polishing of lacquers, enamels etc. all such methods requiring manual application. Such methods are exceedingly laborious and expensive. The polishing compositions that have been used heretofore usually consist of a homogeneous mixture of abrasives and hydrocarbons, or an emulsion of water, hydrocarbon and abrasives plus a soap emulsifying agent. But the application of such polishing compositions by mechanical means has always resulted in failure due to the fact that the various ingredients of the compounds are cohesive and gum the polishing surface of the polishing tool and cause a burning of the lacquer or enamel finish.

It is the object of this invention to provide a polishing composition and a method of application whereby lacquers, paints, enamels etc. may be polished by mechanical means, and whereby above defects may be avoided. A further object is to provide a composition capable of surfacing lacquers, enamels, etc. to the point where a slight polishing is subsequently required to secure a high lustre. A still further object is to provide a composition, and means of applying same, capable of surfacing undercoats, such as primers, primer-surfacers, surfacers etc. lacquers, enamels etc. to such a point whereby any subsequent application of undercoat, enamel, lacquer etc. will have a flat surface to adhere to and thereby not magnify any defect of the original application. A still further object is to provide a composition capable of producing a very high lustre, where the lacquer, enamel etc. has previously been given a preliminary polish. Other objects will appear hereinafter.

These objectives are accomplished by the following invention which comprises forming an emulsion consisting of water, a hydrocarbon or admixtures of hydrocarbons, waxes, vegetable oils or fatty acids, an abrasive and an emulsifying agent, I have discovered that if the amount of the ingredients are each selected with reference to the power of the particular abrasive or abrasives used to absorb water, oil and any such non-volatile or volatile materials as are used in the emulsion new and very satisfactory results are obtained.

When in the further description of my invention reference is made to the oil absorption of the abrasives, it should be clearly understood that, if any other non-volatile material, not oil, is used in preparing the emulsion, the power of absorption of the abrasives for such other non-volatile material should be considered.

Also, the emulsion should be of the oil in water type where the water is the outer phase with oil, the water and emulsifying agent being so proportioned that the resulting mixture will, under the frictional heat generated by its application, evaporate the water and finally result in a breaking of the emulsion, thereby causing the various components, including the abrasive, to lose their mutual cohesiveness. The composition is such that the quantity of binding agents other than water is insufficient to cause the abrasive particles to cohere. Thus, when so much of the water is driven off that the remainder, with the other materials, no longer binds the abrasive, the particles will separate and no gumming of the abrasive can occur. The heat generated by the rubbing, particularly by machine rubbing, is great enough to drive off this water. Also, by using abrasives of different particle size, hardness, and water and oil absorption, sticking and gumming of the polishing surface is materially lessened, as abrasives of the above characteristics are more non-cohesive as a whole, than a single abrasive. Failure to so proportion these ingredients results in a product unsuitable for machine application.

I am unable to give an exact explanation for the results stated above but in all probability abrasives of different oil (hydrocarbon) and water absorption are also different in other respects. It is well known that like substances adhere to each other better than unlike substances.

I have discovered that by determining the water and oil absorption of any abrasive or admixture of abrasives, the proper ratio of abrasive to the non-volatile constituent can be accurately ascertained. By water and oil absorption is meant the amount of water or oil by percent weight which will be absorbed by any particular abrasive to the saturation point. This percentage is usually determined by taking a known amount of abrasive and titrating, by means of a graduated burette, with water or oil until the abrasive plus water or oil becomes just cohesive. The volume of water or oil used for titrating is transposed into percent weight of the sample of abrasive used. The term "non-volatile" as used in the specification and claims is intended to apply to substances having vaporization temperatures above the temperatures to which the composition is heated by the friction of the grinding operation. The following substances, among many other that could be named, are considered non-volatile: the non-volatile hydrocarbons, kerosene being considered non-volatile, vegetable oils, waxes, soaps, sulphonated oils, both acid and neutral, naphthenic acid or its salts, free fatty acids, free alkysolamines, glycerin, etc. I have found that if the non-volatile constituents are kept below the possible total oil or water absorption of any abrasive or abrasives, the resultant compound is suitable for machine operation. But I prefer to keep well below this limit, and prefer to maintain the non-volatile at 25-50% of the total possible absorption, since within these limits it is possible to formulate a polishing composition capable of meeting all practical requirements of polishing lacquer, enamel, etc. and to easily regulate the time of polishing or abrading. But I do not wish it to be understood that I have to limit myself to the numerical limits stated above since they may be lowered or raised to any value provided they remain below the total possible absorption. Also, by maintaining or regulating the ratio of emulsifying agent to water and hydrocarbon, oils, waxes, etc. it is possible to supplement the above conditions of time of polishing or abrading. By limiting the amount of emulsifying agent from 1-6% it is possible to meet the above conditions.

I have also found that by applying the polishing composition of the above limits, either as originally compounded or thinned with water or light volatile petroleum fraction, to lacquer, enamel, undercoats, etc. it is possible, with a mechanical polishing device, either rotatory or reciprocating, to secure a high burnish or polish. Further, I have found that these polishing machines can and should be faced with sheepskin, rubber, rubber covered with drill, felts of various thickness and compactness, or any composition made to simulate these products, in both flat and fluted surfaces, or any combination of these facings.

By the use of such faced mechanical apparatus and polishing composition as outlined above it is possible to polish lacquers, enamels, surfaces, etc. of any degree of hardness or age without burning or gumming either the finish, or loading up or piling on the pad used for polishing. Rather, the composition loses its cohesiveness and thus dusts off as the lacquer, enamel etc. is polished to a bright surface. All compositions heretofore patented or sold have failed in this respect.

The abrasives used in the polishing composition of my invention may be soft silica, silicates, tripoli, rottenstone, kieselguhr, lime, chalk, magnesia, quartz, hard silica, chromium oxide, iron oxide, artificial or natural aluminum oxide, silicon carbide, slate flour, garnet grain, powdered glass, emery flours and grain, or any equivalent thereof. Further, it has been found that the admixture of two or more abrasives of different particle size and different water and oil absorption is to be preferred. Such an admixture assists in preventing the packing or piling up of abrasive on the polishing pads.

The organic component used in the polishing composition of my invention may be hydrocarbon oils of various Bé. and boiling range, vegetable oils such as castor, soya, linseed etc. waxes such as paraffin, carnauba, candelilla, beeswax etc. fatty acids such as oleic, stearic, palmitic etc. either singly or admixtures of two or more.

As an emulsifying agent, I have found that water soluble gums, sulfonated oils such as turkey red oil, sulfonated alcohols, potassium, sodium or alkylolamine soaps, bentonite, napthenic acid or its salts, soluble oils, borax, twitchell reagents, sodium or potassium carbonate or bicarbonate, or their equivalent, either singly or admixture of two or more give the preferred results.

The preparation of the polishing composition consists of taking the proper amount of non-water soluble organic matter, water and emulsifying agent and making an emulsion of same in either a jacketed or non-jacketed mixer, a jacketed mixer being preferred, so that heat may be applied, said heat assisting in obtaining a smooth emulsion. To this emulsion is added the abrasive or abrasives in the predetermined amount. The resultant mixture is then stirred until smooth, allowed to cool while stirring, if heat has been used, and is then ready for use.

An example of polishing composition, as outlined above, is comprised of the following by weight:

| | Percent |
|---|---|
| Water | 22.48 |
| Sodium hydrate | .285 |
| Pt. hydrate | .312 |
| Mineral spirits | 15.10 |
| Light oil | 1.98 |
| Paraffin wax | 5.10 |
| Stearic acid | 2.04 |
| Oleic acid | 2.02 |
| Bentonite | .893 |
| D. G. rose tripoli | 22.85 |
| D. G. cream tripoli | 22.85 |
| Silica | 4.09 |

To the water as shown above, is added the sodium and potassium hydrate. While being vigorously agitated, the paraffin wax, stearic acid, oleic acid, which have previously been melted in the mineral spirits and oil, are added. Agitation is continued until homogeneous. The bentonite, D. G. rose tripoli, D. G. cream tripoli and silica are now added. The total mass is continually agitated until smooth. The entire contents of the mixer are maintained at a sufficiently high temperature to make the compound fluid and thus capable of being better agitated. After the mass has become homogeneous, it is allowed to cool to room temperature after which it is ready for use either in its present state or thinned with water.

The abrasives used in this compound have a water and oil absorption of 30.73% and 29.45% respectively. The total non-volatile organic material used is 11.737%. This amount falls within the preferred range of 25-50% of the possible total water or oil absorption.

In another and preferred example, the ingredients are as follows:

| | Percent |
|---|---|
| Water | 28.89 |
| Kerosene | 7.44 |
| Light oil | 4.50 |
| Turkey red oil (50% sulfonated castor oil) | 1.56 |
| Bentonite | .28 |
| D. G. rose tripoli | 30.42 |
| D. G. cream tripoli | 20.72 |
| Silica | 6.19 |

To the water and turkey red oil, as shown above, are added the kerosene and light oil and agitated until homogeneous. The bentonite, D. G. rose tripoli, D. G. cream tripoli and silica are now added and the entire mass agitated until homogeneous.

Still another and preferred example, the ingredients are as follows:

| | Percent |
|---|---|
| Water | 30.35 |
| Potassium hydrate | .21 |
| Turkey red oil (50% sulfonated castor oil) | 1.37 |
| Kerosene | 7.76 |
| Oil | 1.46 |
| Beeswax | .97 |
| Oleic acid | 1.94 |
| Bentonite | 1.94 |
| Rottenstone | 5.82 |
| D. G. rose tripoli | 19.63 |
| D. G. cream tripoli | 20.12 |
| Aluminum oxide | 8.73 |

To the water solution of potassium hydrate and Turkey red oil, is added the oleic acid, beeswax and oil which have been previously dissolved or dispersed in the kerosene. These ingredients are then rapidly agitated until a homogeneous emulsion is obtained. The bentonite, D. G. rose tripoli, D. G. cream tripoli and the aluminum oxide are now added and the entire mass stirred until homogeneous. The entire contents of the mixer is maintained at an elevated temperature, preferably at 140° F., to facilitate through mixing and soap formation. After the mass has become homogeneous, it is allowed to cool to room temperature after which it is ready for use, either in its present state or thinned with water.

Although the above examples call for certain proportions or percentage of various ingredients, many other ingredients and percentages may be employed as substitutes for those indicated. For instance, carnauba, Montan paraffin, candelilla wax may be substituted for the beeswax as shown in example #3; stearic, palmitic, linoleic, linolinic acid for oleic, silicon carbide for the aluminum oxide. Likewise, the amounts may be varied if it is borne in mind that the non-volatile organic components are kept below the possible water or oil absorption of the abrasive used; and the amount of emulsifying agent so proportioned as to produce an oil in water type of emulsion which by the evaporation of a comparative slight amount of water, will cause the emulsion to break.

The polishing or abrading composition as described above is characterized by the property of polishing or abrading lacquers, enamels, undercoats, etc. to a high lustre or surface by means of a mechanical polishing machine, either of the rotating or reciprocating type. Also, the method of mechanical polishing or abrading, using a composition such as outlined above, has resulted in material savings of time and labor to manufacture of automobiles, furniture and the like, where a highly polished finish is desirable. A further advantage of such a method and composition is that the polishing and abrading necessary for any particular article results not only in a saving of time and labor, but produces a very superior polish or surface.

As many apparent and widely different embodiments of this invention may be made without departing from the spirit and scope thereof, it is to be understood that I do not limit myself to a specific embodiment thereof except as defined in the appended claims.

What I claim is:

1. An abrading and polishing composition comprising abrasive particles and an emulsion which holds the composition cohesively together, said emulsion containing volatile materials and non-volatile ingredients selected from any of the hydrocarbons, vegetable oils, waxes, fatty acids, soaps, sulphonated oils, glycerine, soluble oils or free alkylolamines, said non-volatile materials being less in quantity than the absorptive power of said abrasive particles for said non-volatile materials, so that when the volatile material evaporates, the abrasive particles will no longer be held together by cohesion.

2. An abrading and polishing composition as in claim 1, where the emulsion is of the oil in water type.

3. An abrading and polishing composition as in claim 1, where the emulsifying agent forms 1-6% of the emulsion.

4. An abrading and polishing composition as in claim 1, where the abrasive particles are of different composition and have different absorptive characteristics for the constituents of the emulsion.

5. An abrading and polishing composition comprising abrasive particles and an emulsion, said emulsion containing non-volatile and volatile materials and an emulsifying agent and being of the oil-in-water type, said emulsifying agent forming from 1% to 6% of the emulsion, and said non-volatile material being less than the absorptive power of said abrasives for said non-volatile materials, and the whole emulsion being sufficient to hold the composition cohesively together but insufficient if a portion of said volatile materials evaporates, so that when in the act of polishing said portion of the volatile materials evaporates, the composition will lose its cohesiveness, and so that by varying the percentage of the emulsifying agent the amount of evaporation and the time of polishing can be varied proportionally.

6. An abrading and polishing composition comprising abrasive particles and an emulsion, said emulsion containing non-volatile and volatile material and being of the oil-in-water type, said non-volatile materials being less than the absorptive power of said abrasives for said non-volatile materials, the whole emulsion being sufficient to hold the composition cohesively together but insufficient to do so if a portion of the volatile material evaporates, so that when in the act of polishing said portion evaporates, the composition will lose its cohesiveness.

PHILIP ALFRED PATTERSON.